(12) United States Patent 
Zhang et al.

(10) Patent No.: US 12,570,160 B2 
(45) Date of Patent: Mar. 10, 2026

(54) GEAR SHIFTING METHOD, CONTROL UNIT, PROGRAM PRODUCT, ELECTRIC DRIVE SYSTEM, AND ELECTRIC VEHICLE

(71) Applicant: Robert Bosch GmbH, Stuttgart (DE)

(72) Inventors: Hantian Zhang, Wuxi (CN); Baoyu Liu, Wuxi (CN); Bo Wei, Wuxi (CN); Chengjun Tao, Wuxi (CN); Peng Rui, Wuxi (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/672,548

(22) Filed: May 23, 2024

(65) Prior Publication Data

US 2024/0399893 A1 Dec. 5, 2024

(30) Foreign Application Priority Data

May 29, 2023 (CN) .......................... 202310618099.0

(51) Int. Cl.
 *F16H 61/04* (2006.01)
 *B60L 15/20* (2006.01)
 (Continued)

(52) U.S. Cl.
 CPC .......... *B60L 15/2054* (2013.01); *F16H 59/36* (2013.01); *F16H 59/66* (2013.01);
 (Continued)

(58) Field of Classification Search
 CPC .......... B60L 15/2054; B60L 2240/421; B60L 2240/642; F16H 59/36; F16H 59/66; F16H 61/0403; F16H 2059/366; F16H 2059/663; F16H 2061/0422; F16H 2061/047; F16H 2200/0021; F16H 59/46; F16H 2059/462; F16H 61/04; F16H 2061/0474;
 (Continued)

(56) References Cited

U.S. PATENT DOCUMENTS

| | | | | |
|---|---|---|---|---|
| 6,123,642 A | * | 9/2000 | Saito | B60W 20/40 477/3 |
| 2016/0075337 A1 | | 3/2016 | Vespasien | |
| 2018/0180167 A1 | * | 6/2018 | Peterson | B60W 50/00 |

FOREIGN PATENT DOCUMENTS

| | | | | |
|---|---|---|---|---|
| CN | 112930452 B | 7/2022 | | |
| DE | 19530233 A1 | * | 2/1997 | B60W 20/00 |

(Continued)

*Primary Examiner* — Tisha D Lewis 
(74) *Attorney, Agent, or Firm* — Maginot, Moore & Beck LLP

(57) ABSTRACT

A gear shifting method is for use in electric vehicles. The gear shifting method includes a speed adjustment process in which a speed adjustment request is issued to adjust the rotational speed of the drive motor of the electric vehicle, ensuring that the absolute rotational speed difference between the output-side engagement component and the input-side engagement component remains within the range of 10 rpm to 30 rpm when the input-side engagement component and the output-side engagement component of the transmission, driven by the drive motor, are disengaged. The method also includes an engagement process in which an engagement command is issued after the completion of the speed adjustment process, so as to engage the input-side engagement component with the output-side engagement component for gear engagement.

13 Claims, 3 Drawing Sheets

(51) Int. Cl.
    *F16H 59/36*         (2006.01)
    *F16H 59/66*         (2006.01)

(52) U.S. Cl.
    CPC .... *F16H 61/0403* (2013.01); *B60L 2240/421*
        (2013.01); *B60L 2240/642* (2013.01); *F16H*
        *2059/366* (2013.01); *F16H 2059/663*
        (2013.01); *F16H 2061/0422* (2013.01); *F16H*
        *2061/047* (2013.01); *F16H 2200/0021*
        (2013.01)

(58) Field of Classification Search
    CPC ...... F16H 61/0204; F16H 59/40; F16H 59/42;
        F16H 59/60; F16H 63/50; B60K
        2001/001
    See application file for complete search history.

(56)              References Cited

FOREIGN PATENT DOCUMENTS

| | | | |
|---|---|---|---|
| DE | 10 2006 003 715 A1 | 8/2007 | |
| JP | 2014105826 A   * | 6/2014 | ........... B60W 10/02 |
| WO | 2011/076485 A1 | 6/2011 | |

\* cited by examiner

GEAR SHIFTING METHOD, CONTROL UNIT, PROGRAM PRODUCT, ELECTRIC DRIVE SYSTEM, AND ELECTRIC VEHICLE

This application claims priority under 35 U.S.C. § 119 to patent application no. CN 2023 1061 8099.0, filed on May 29, 2023 in China, the disclosure of which is incorporated herein by reference in its entirety.

The present application relates to a gear shifting method for use in electric vehicles, a transmission control unit (TCU) for use in electric vehicles, a computer program product, an electric drive system for use in electric vehicles, and an electric vehicle.

BACKGROUND

In order to achieve more flexible and convenient adjustment of speed and torque, the electric drive system for electric vehicles is equipped with a transmission capable of shifting gears. However, the current transmission has a limited success rate of gear shifting. To this end, there is a need to provide an improved method of gear shifting for use in electric vehicles.

SUMMARY

The purpose of this application is to provide a gear shifting method for use in electric vehicles that can improve the success rate of gear shifting.

According to a first aspect of the present application, a gear shifting method for use in electric vehicles is provided, wherein the gear shifting method comprises at least a speed adjustment process, wherein a speed adjustment request is issued to adjust the rotational speed of the drive motor of the electric vehicle, ensuring that the absolute rotational speed difference between the output-side engagement component and the input-side engagement component remains within the range of 10 rpm (revolutions per minute) to 30 rpm when the input-side engagement component and the output-side engagement component of the transmission, driven by the drive motor, are disengaged;

and an engagement process, wherein an engagement command is issued after the completion of the speed adjustment process, so as to engage the input-side engagement component with the output-side engagement component for gear engagement.

The rotational speed difference between the output-side engagement component and the input-side engagement component should be understood as the rotational speed of the output-side engagement component minus the rotational speed of the input-side engagement component.

According to one optional example of the present application, during the speed adjustment process, the rotational speed difference between the output-side engagement component and the input-side engagement component is set to a preset value, the absolute value of which is within the range of 10 rpm to 30 rpm.

According to one optional example of the present application, when the electric vehicle is on a level road, the absolute value of the preset value is within the range of 13 rpm to 17 rpm, particularly 15 rpm.

According to one optional example of the present application, when the electric vehicle is on an uphill slope, the preset value is set to be greater than when on a level road, and it increases with the increase in uphill gradient.

According to one optional example of the present application, when the electric vehicle is on a downhill slope, the preset value is set to be smaller than when on a level road, and it decreases with the increase in downhill gradient;

According to one optional example of the present application, the preset value is a fixed value.

According to one optional example of the present application, the input-side engagement component and the output-side engagement component are adapted to engage with each other internally;

According to one optional example of the present application, the input-side engagement component is a ring gear, and the output-side engagement component is a bushing, and during the engagement process, the engagement command causes the shifting fork to move the bushing to engage with the ring gear.

According to one optional example of the present application, during the speed adjustment process, the requested rotational speed Vm of the drive motor is determined by the following formula:

$$Vr = Vs0 - A - B;$$

$$Vm = Vr * i;$$

wherein Vs0 denotes the rotational speed of the output-side engagement component at the moment T0 at which the speed adjustment request is issued, Vr denotes the target rotational speed of the input-side engagement component, A denotes the preset value, B denotes the compensation value, and i denotes the transmission ratio from the drive motor to the input-side engagement component.

According to one optional example of the present application, B=k*ΔT, wherein k represents the slope of change of the rotational speed of the output-side engagement component known at time T0, and ΔT is one of the following three times or the sum of two or more of the following three times: the communication time from the TCU, which controls the transmission of the electric vehicle, to the motor control unit (MCU), which controls the drive motor; the time for the MCU to execute one step; and the communication time from the MCU to the TCU.

According to one optional example of the present application, the speed adjustment process comprises a judgment step, wherein it is determined whether the speed adjustment has been completed based on whether the preset conditions have been continuously met for the preset time, with the preset conditions comprising at least one of the following:

the deviation between the actual rotational speed of the input-side engagement component and the target rotational speed Vr is within a first error range;

the deviation of the rotational speed difference between the actual rotational speed of the output-side engagement component and the actual rotational speed of the input-side engagement component from the preset value is within a second error range.

According to one optional example of the present application, the first error range and the second error range are ±2 rpm;

According to one optional example of the present application, the preset time is 20 ms.

According to a second aspect of the present application, a TCU for use in electric vehicles is provided, wherein the TCU is configured to execute the above gear shifting method.

According to a third aspect of the present application, a computer program product comprising computer program instructions is provided, wherein when the computer program instructions are executed by one or a plurality of processors, the processors are capable of performing the gear shifting method according to the above gear shifting method.

According to a fourth aspect of the present application, an electric drive system for use in electric vehicles is provided, characterized in that the electric drive system comprises a drive motor, a transmission, and a TCU.

According to one optional example of the present application, the electric drive system is an e-axle.

According to one optional example of the present application, the input-side engagement component of the transmission directly engages with the output-side engagement component and there is no synchronizer ring between them.

According to one optional example of the present application, the electric drive system comprises an MCU and an inverter for controlling the drive motor.

According to one optional example of the present application, the electric drive system does not have a clutch.

According to one optional example of the present application, the electric drive system comprises an input shaft rotational speed sensor for the input shaft and an output shaft rotational speed sensor for the output shaft, wherein the input shaft directly or indirectly drives the input-side engagement component of the transmission, and the output-side engagement component of the transmission directly or indirectly drives the output shaft.

According to a fourth aspect of the present application, an electric vehicle is provided, wherein comprises the above electric drive system.

In some examples, the positive effects of the present application are as follows: it can greatly increase the success rate of gear shifting; it eliminates the need for synchronizer rings used in a conventional transmission for assisting in gear engagement.

BRIEF DESCRIPTION OF THE DRAWINGS

The present application is described in greater detail below with reference to the accompanying drawings to provide a better understanding of its principles, features, and advantages. The accompanying drawings include the following.

DETAILED DESCRIPTION

To provide a clearer understanding of the technical problem, technical solution, and beneficial technical effect addressed by the present application, the following detailed description of the present application is provided with reference to the accompanying drawings and multiple exemplary examples. It should be understood that the specific examples described herein are provided solely for the purpose of explaining the present application and not for limiting the scope of protection of the present application.

In order to achieve more flexible and convenient adjustment of speed and torque, the electric drive system for electric vehicles is equipped with a transmission capable of shifting gears.

Figure 1:
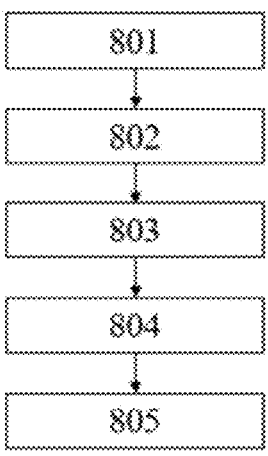
FIG. 1 schematically illustrates, in a flowchart, an example of the entire gear shifting procedure for the electric drive system of an electric vehicle.

FIG. 1 schematically illustrates, in a flowchart, an example of the entire gear shifting procedure for the electric drive system of an electric vehicle. This electric drive system is for example, an e-axle, but other forms of electric drive systems may also be conceived. After receiving a gear shifting request, as shown in FIG. 1, the entire gear shifting procedure comprises, for example:

torque reduction 801: reducing the torque of the drive motor;

gear disengagement 802: disengaging the pair of gears of the current gear position of the transmission;

speed adjustment 803: adjusting the speed of the pair of gears to be engaged in the new gear position;

gear engagement 804: engaging the pair of gears of the new gear position;

torque restoration 805: adjusting the torque of the drive motor according to the requirement.

In the existing speed adjustment, the condition for completion of the speed adjustment is that the rotational speed difference of the pair of gears in the new gear position is within a predetermined range, such as ±50 rpm. The specific value of the rotational speed difference is not of concern here. However, this type of speed adjustment results in a limited success rate during gear engagement, sometimes leading to gear shifting failure and requiring repeated attempts.

Figure 2:
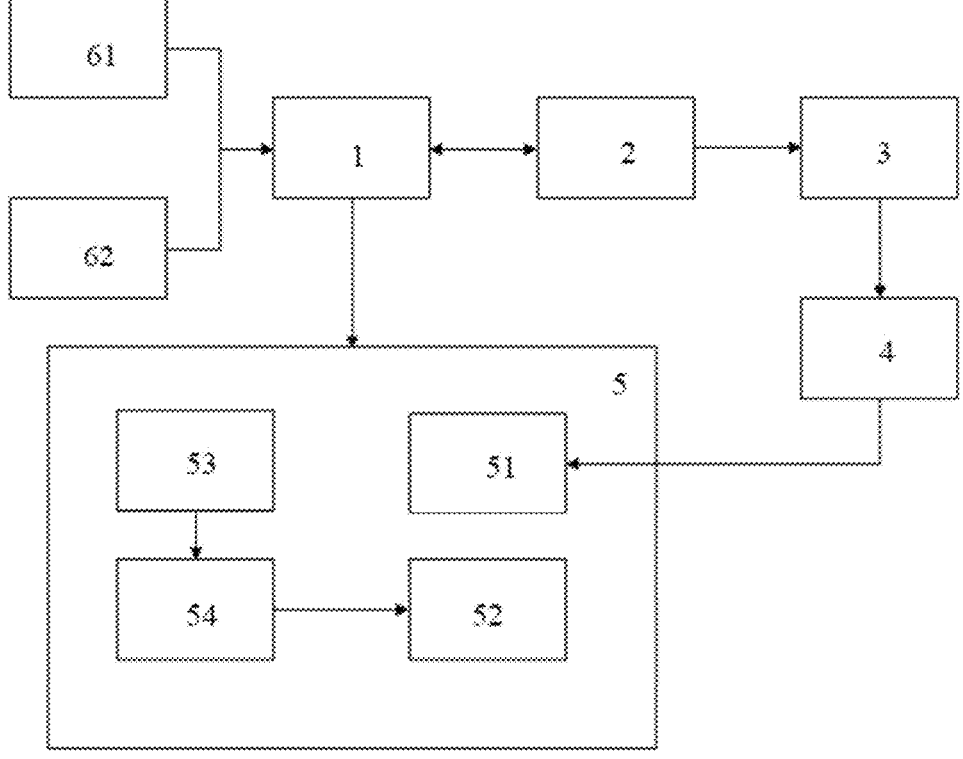
FIG. 2 schematically illustrates an example of a structural diagram of the electric drive system.

FIG. 2 schematically illustrates an example of a structural diagram of the electric drive system.

As shown in FIG. 2, the electric drive system may comprise, for example, a drive motor 4, a transmission 5, and a TCU 1. The TCU 1 is used to control the transmission 5. The electric drive system may further comprises an MCU 2 and an inverter 3 for controlling the drive motor 4; The MCU 2 is capable of adjusting the rotational speed of the drive motor 4 through the inverter 3.

According to one exemplary example, the electric drive system does not have a clutch. Unlike the engine of a conventional fuel vehicle, since the rotational speed of the drive motor 4 can be easily controlled, gear shifting may be facilitated via the direct coordination of the drive motor 4, thus eliminating the need for a clutch in the electric drive system. However, it is also conceivable that the electric drive system still has a clutch.

The transmission 5 may comprise, for example, an input-side engagement component 51 and an output-side engagement component 52. When the input-side engagement component 51 engages with the output-side engagement component 52, the gear engagement is completed.

Figure 4:
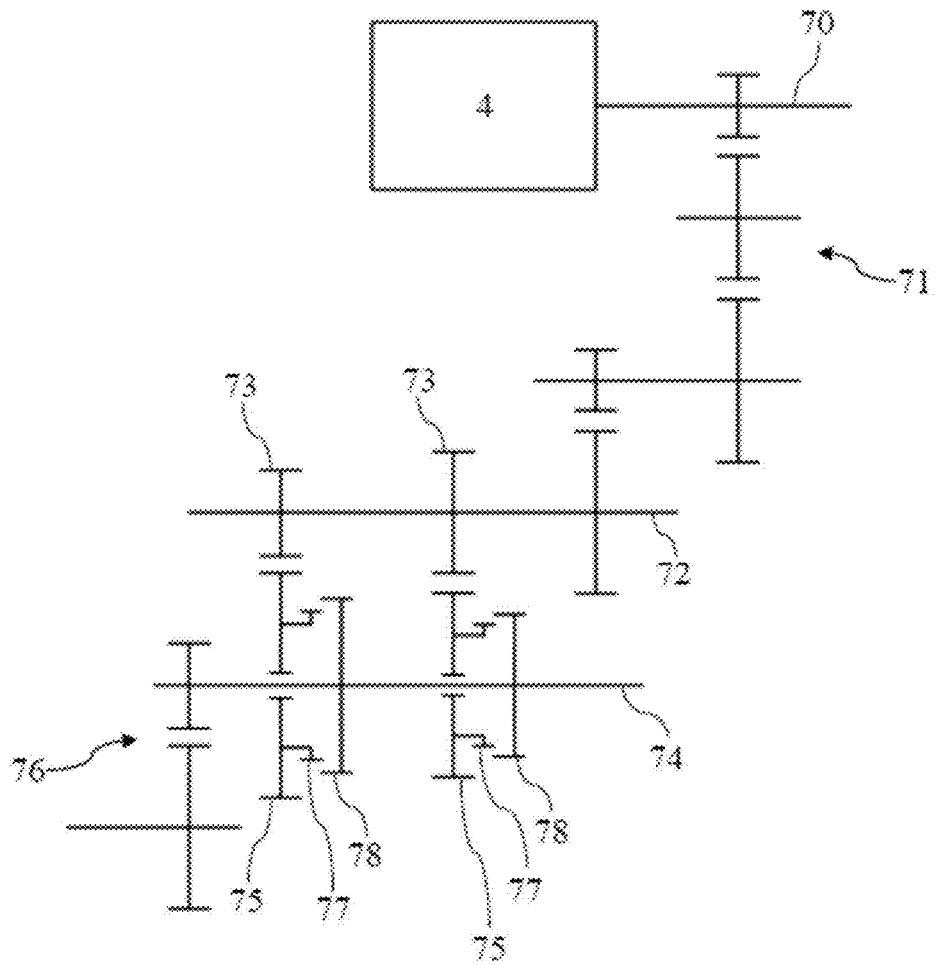
FIG. 4 schematically illustrates an example of the gear system of the electric drive system.

According to one exemplary example, the input-side engagement component 51 is a ring gear 77 and the output-side engagement component 52 is a bushing 78 (see FIG. 4). The transmission 5 may in this case may comprise a hydraulic actuator 53 and a shifting fork 54. During the engagement process, the engagement command causes the shifting fork 54 to move the bushing 78 to engage with the ring gear 77. Depending on the type of transmission 5, the input-side engagement component 51 and the output-side engagement component 52 may also have other configurations and, accordingly, the input-side engagement component 51 and the output-side engagement component 52 may be engaged in other ways.

According to one exemplary example, the input-side engagement component 51 and the output-side engagement component 52 are adapted to engage with each other internally. However, depending on the type of transmission 5, it is also possible for the input-side engagement component 51 and the output-side engagement component to be adapted to engage with each other externally.

The electric drive system may, for example, further comprise an input shaft rotational speed sensor 61 for the input shaft and an output shaft rotational speed sensor 62 for the output shaft, wherein the input shaft directly or indirectly drives the input-side engagement component 51 of the transmission 5, and the output-side engagement component 52 of the transmission 5 directly or indirectly drives the output shaft. The TCU 1 can obtain the speed of the input-side engagement component 51 based on the input shaft rotational speed collected by the input shaft rotational speed sensor 61, and obtain the speed of the output-side engagement component 52 based on the output shaft speed collected by output shaft rotational speed sensor 62.

The gear shifting method comprises at least a speed adjustment process, wherein a speed adjustment request is issued to adjust the rotational speed of the drive motor 4 of the electric vehicle, ensuring that the absolute rotational speed difference between the output-side engagement component 52 and the input-side engagement component 51 remains within the range of 10 rpm to 30 rpm when the input-side engagement component 51 and the output-side engagement component 52 of the transmission 5, driven by the drive motor 4, are disengaged;

and an engagement process, wherein an engagement command is issued after the completion of the speed adjustment process, so as to engage the input-side engagement component 51 with the output-side engagement component 52 for gear engagement.

By ensuring that the rotational speed difference between the input-side engagement component 51 and the output-side engagement component 52 is neither too small nor too large, it greatly increases the success rate of gear shifting, and on the other hand, it makes it possible to dispense with the synchronizer rings used in a conventional transmission 5 for assisting in gear engagement.

Figure 3:
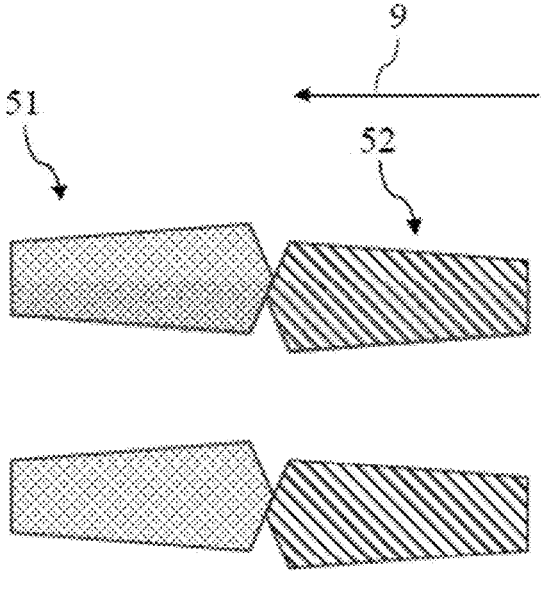
FIG. 3 schematically illustrates two adjacent teeth of the input-side engagement component with two adjacent teeth of the output-side engagement component.

FIG. 3 schematically illustrates two adjacent teeth of the input-side engagement component 51 with two adjacent teeth of the output-side engagement component 52. If the rotational speed difference is too small or even equal to zero, as shown in FIG. 3, it can be seen that when shifting in the direction of gear engagement 9, the input-side engagement component 51 and the output-side engagement component 52 are likely to rotate synchronously after the initial collision, thus resisting each other and preventing gear engagement. Therefore, to a certain extent, the present application also overcomes the technical bias of "ensuring consistency between the rotational speeds of the input-side engagement component 51 and the output-side engagement component 52 as much as possible" during speed adjustment. If the rotational speed difference is too large, a tooth on the output-side engagement component 52 knocked out of the way by a new tooth of the input-side engagement component 51 before it is fully engaged, thereby resulting in gear engagement failure due to many improper engagements.

According to one exemplary example, during the speed adjustment process, the rotational speed difference between the output-side engagement component 52 and the input-side engagement component 51 is set to a preset value, the absolute value of which is within the range of 10 rpm to 30 rpm. That is, the completion of speed adjustment is not judged merely by whether the rotational speed difference is within a defined range, but by whether the rotational speed difference is equal to a preset value. The rotational speed difference between the output-side engagement component 52 and the input-side engagement component 51 is thereby adjusted to a desired preset value with extreme accuracy upon the completion of speed adjustment, thereby further increasing the success rate of gear engagement.

According to one exemplary example, when the electric vehicle is on a level road, the absolute value of the preset value is within the range of 13 rpm to 17 rpm, particularly 15 rpm. The optimum value of the preset value can, for example, be determined by means of full-vehicle testing. It is conceivable that in full-vehicle testing, the success rate of gear shifting for different preset values may be determined and an optimal preset value may be selected therefrom.

The preset value may also be determined based on information related to road conditions. Here, the information may comprise the current slope, current surface humidity, current weather, etc. This can further increase the success rate of gear shifting.

According to one exemplary example, when the electric vehicle is on an uphill slope, the preset value is set to be greater than when on a level road, and it increases with the increase in uphill gradient; and/or when the electric vehicle is on a downhill slope, the preset value is set to be smaller than when on a level road, and it decreases with the increase in downhill gradient; When going uphill, the steeper the slope, the greater the resistance against the electric vehicle. Here, setting the preset value greater than that when on flat roads can actually increase the success rate of gear shifting. When going downhill, the resistance against the electric vehicle decreases, and setting the preset value lower than that when on flat roads can increase the success rate of gear shifting.

Alternatively, the preset value may also be a fixed value. For example, regardless of road conditions, the preset value may always be set to +15 rpm.

According to one exemplary example, during the speed adjustment process, the requested rotational speed Vm of the drive motor is determined by the following formula:

$$Vr = Vs0 - A - B;$$

$$Vm = Vr * i;$$

wherein Vs0 denotes the rotational speed of the output-side engagement component at the moment T0 at which the speed adjustment request is issued, Vr denotes the target rotational speed of the input-side engagement component 51, A denotes the preset value, B denotes the compensation value, and i denotes the transmission ratio from the drive motor 4 to the input-side engagement component 51. The compensation value is in particular used to compensate for deviations in the rotational speed of the output-side engagement component due to process time, which may comprise the process time from the issuance of a speed adjustment request and the actual execution of the speed adjustment and/or the process time between the execution of the speed adjustment and the actual knowledge that the speed adjustment has been executed.

According to one exemplary example, B=k*ΔT, wherein k represents the slope of change of the rotational speed of the output-side engagement component 52 known at time T0, and ΔT is one of the following three times or the sum of two or more of the following three times: the communication time from the TCU 1 to the MCU 2, the time for the MCU 2 to execute one step; and the communication time from the MCU 2 to the TCU 1. ΔT is in particular the sum of the communication time from the TCU 1 to the MCU 2, the time for the MCU 2 to execute one step; and the communication time from the MCU 2 to the TCU 1. The compensation value can thus be calculated very accurately. However, other methods for setting the compensation value B are also conceivable, such as setting it to a fixed value.

Here, an illustrative example is provided to demonstrate how to calculate the requested speed Vm of the drive motor 4:

Assuming that through full-vehicle testing, it is determined that the success rate of gear shifting is highest when the rotational speed difference between the output-side engagement component 52 and the input-side engagement component 51 is +15 rpm, i.e., when the bushing is 15 rpm faster than the ring gear, the preset value A may be set to 15 rpm;

In the speed adjustment process, assuming that at the moment T0 when the speed adjustment request is issued, the actual measured speed Vs0 of the bushing is 500 rpm, and the obtained change rate of the ring gear's rotational speed k is 0.2, and that the communication time from the TCU 1 to the MCU 2, the time for the MCU 2 to execute one step, and the communication time from the MCU 2 to the TCU 1 are typically fixed values, for example, 10 ms each, the compensation value B may thus be calculated as B=k*ΔT=0.2*(10+10+10)=6 rpm, and the target speed of the ring gear is hence Vr=Vs0–A–B=500–15–6=479 rpm. The drive ratio i is known and in this case is, for example, 5. The requested rotational speed of the drive motor 4 Vm=Vr*i=479*5=2,395 rpm.

According to one exemplary example, the speed adjustment process comprises a judgment step, wherein it is determined whether the speed adjustment has been completed based on whether the preset conditions have been continuously met for a preset time, with the preset conditions comprising at least one of the following:

the deviation between the actual rotational speed of the input-side engagement component 51 and the target rotational speed Vr is within a first error range;

the deviation of the rotational speed difference between the actual rotational speed of the output-side engagement component 52 and the actual rotational speed of the input-side engagement component 51 from the preset value is within a second error range.

The process reliability of the gear shifting method may be effectively improved by the judgment step. However, it is also possible to not perform the judgment step, i.e., the TCU 1 issues an engagement command directly after receiving confirmation of speed adjustment execution from the MCU 2.

The first error range and the second error range are, for example, ±2 rpm; the preset time is, for example, 20 ms. However, other suitable values may be selected according to the actual situation.

FIG. 4 schematically illustrates an example of the gear system of the electric drive system.

As can be seen in FIG. 4, the motor shaft 70 of the drive motor 4 is connected to the first shaft 72 via a first speed reduction mechanism 71 for speed reduction of the transmission 5. The first shaft 72 is exemplarily secured with two first gears 73, which are constantly engaged with two second gears 75 capable of rotating relative to each other and supported on a second shaft 74. The two first gears 73 and the two second gears 75 constitute two different gear ratios or, in other words, two different gear positions. The two second gears 75 each have, for example, a ring gear 77 fixed thereto. The second shaft 74 is further provided with two bushings 78 that rotate synchronously with the second shaft 74. These two bushings 78 may be axially moved relative to the second shaft 74 under the control of the corresponding shifting fork 54. In FIG. 4, the bushing 78 and the ring gear 77 are in a disengaged state. If the left gear position is selected, the left bushing 78 is pushed to the left to engage with the left ring gear 77; if the right gear position is selected, the right bushing 78 is pushed to the left to engage with the right ring gear 77. The second shaft 74 is, for example, further connected to the wheel axle via a second speed reduction mechanism 76 used for speed reduction. Clearly, the various components in FIG. 4, as well as their quantity and relative positional relationships, should be understood as merely exemplary and should not be construed as restrictive representations.

According to one exemplary example, as shown in FIG. 4, the bushing 78 of the transmission 5 directly engages with the ring gear 77 and there is no synchronizer ring between them.

In conjunction with FIG. 2 and FIG. 4, an example of a more specific gear shifting procedure is as follows:

a gear shifting request is received;

the MCU 2 reduces the torque of the drive motor 4 via the inverter 3;

the TCU 1 controls the hydraulic actuator 53 to move the shifting fork 54 of the current gear position, causing the bushing 78 of the current gear position to disengage from the ring gear 77;

The TCU 1 calculates the speed Vs0 of the bushing 78 of the new gear position based on the output shaft rotational speed collected by the output shaft sensor, and determines, in particular, the preset value A based on the current slope, as well as calculates the compensation value B, and finally calculates, by means of these, the target speed Vr of the ring gear 77 of the new gear position and the required drive motor rotational speed Vm to be requested from the MCU 2;

after receiving the request from the TCU 1, the MCU 2 adjusts the rotational speed of the drive motor 4 to the requested drive motor rotational speed Vm via the inverter 3 and notifies the TCU 1;

the TCU 1 executes the judgment step after receiving the notification;

after determining the completion of the speed adjustment through the judgment step, the TCU 1 controls the hydraulic actuator 53 to move the shifting fork 54 of the new gear position, causing the bushing 78 of the new gear position to engage with the ring gear 77, thereby completing the gear engagement;

the MCU 2 adjusts the drive motor 4 to the target torque via the inverter 3;

For the mentioned numerical ranges, it should be understood that the present application discloses examples that include both the boundary values of the numerical range and at least partially cover them, as well as examples where the boundary values of the numerical range are not included. The terms "first" and "second" are intended only to avoid conflation of elements and are not related to the quantity or importance of the elements. "For use in electric vehicles" should be understood as "may be used" rather than "may only be used". Clearly, the gear shifting method, TCU, and electric drive system of the present application may also be applicable to other electric transportation vehicles.

Although specific embodiments of the present application have been described in detail here, they are provided solely for explanatory purposes and should not be construed as limiting the scope of the present application. Various substitutions, alterations, and modifications may be conceived without departing from the spirit and scope of the present application. The various typical examples and examples cited in the present application may be freely combined with each another, without limitation to the descriptions in the Specification, under non-contradictory circumstances.

LIST OF REFERENCE NUMERALS

1 Transmission control unit
2 Motor control unit
3 Inverter
4 Drive motor
5 Transmission
51 Input-side engagement component
52 Output-side engagement component
53 Hydraulic actuator
54 Shifting fork
61 Input shaft rotational speed sensor
62 Output shaft rotational speed sensor
70 Motor shaft
71 First speed reduction mechanism
72 First axle
73 First gear
74 Second shaft
75 Second gear
76 Second speed reduction mechanism
77 Ring gear
78 Bushing
801 Torque reduction
802 Gear disengagement
803 Speed adjustment
804 Gear engagement
805 Torque restoration
9 Direction of gear engagement

What is claimed is:

1. A gear shifting method for use in electric vehicles, comprising:
executing a speed adjustment process, which comprises:
setting an absolute rotational speed difference between an output-side engagement component and an input-side engagement component to a preset value, wherein an absolute value of the preset value is within a range of 10 rpm to 30 rpm; and
issuing a speed adjustment request to adjust a rotational speed of a drive motor of the electric vehicle to the preset value when the input-side engagement component and the output-side engagement component of a transmission, driven by the drive motor, are disengaged;
executing an engagement process, which includes issuing an engagement command after completion of the speed adjustment process, so as to engage the input-side engagement component with the output-side engagement component for gear engagement; and
at least one of the following:
when the electric vehicle is on an uphill slope, the preset value is set to be greater than when on a level road, and the preset value increases with an increase in uphill gradient; and when the electric vehicle is on a downhill slope, the preset value is set to be smaller than when on a level road, and the preset value decreases with an increase in downhill gradient.

2. The gear shifting method according to claim 1, wherein, when the electric vehicle is on a level road, the absolute value of the preset value is within a range of 13 rpm to 17 rpm.

3. The gear shifting method according to claim 1, wherein the gear shifting method comprises at least one of the following:
the input-side engagement component and the output-side engagement component are adapted to engage with each other internally; and
the input-side engagement component is a ring gear, and the output-side engagement component is a bushing, and during the engagement process, the engagement command causes a shifting fork to move the bushing to engage with the ring gear.

4. A non-transitory storage medium comprising:
a computer program product comprising computer program instructions configured such that, when the computer program instructions are executed by at least one processor, the at least one processor performs the gear shifting method according to claim 1.

5. A transmission control unit for use in electric vehicles, wherein the transmission control unit is configured to execute the gear shifting method according to claim 1.

6. An electric drive system for use in electric vehicles, wherein the electric drive system comprises the drive motor, the transmission, and the transmission control unit according to claim 5.

7. The electric drive system according to claim 6, wherein the electric drive system comprises at least one of the following:
the electric drive system is an e-axle;
the input-side engagement component of the transmission directly engages with the output-side engagement component and there is no synchronizer ring therebetween;
the electric drive system comprises a motor control unit and an inverter for controlling the drive motor; and
the electric drive system does not have a clutch.

8. The electric drive system according to claim 6, further comprising:
an input shaft rotational speed sensor operably connected to an input shaft; and
an output shaft rotational speed sensor operably connected to an output shaft,
wherein the input shaft directly or indirectly drives the input-side engagement component of the transmission, and the output-side engagement component of the transmission directly or indirectly drives the output shaft.

9. An electric vehicle, comprising the electric drive system according to claim 6.

10. A gear shifting method for use in electric vehicles, comprising:
executing a speed adjustment process, which comprises:
setting an absolute rotational speed difference between an output-side engagement component and an input-side engagement component to a preset value, wherein an absolute value of the preset value is within a range of 10 rpm to 30 rpm; and
issuing a speed adjustment request to adjust a rotational speed of a drive motor of the electric vehicle to the preset value when the input-side engagement component and the output-side engagement component of a transmission, driven by the drive motor, are disengaged; and executing an engagement process, which includes issuing an engagement command after completion of the speed adjustment process, so as to engage the input-side engagement component with the output-side engagement component for gear engagement, wherein:

during the speed adjustment process, a requested rotational speed Vm of the drive motor is determined by the formula $$Vr = Vs0 - A - B;$$

$$Vm = Vr * i;$$

Vs0 denotes a rotational speed of the output-side engagement component at a moment T0 at which the speed adjustment request is issued;

Vr denotes a target rotational speed of the input-side engagement component;

A denotes the preset value;

B denotes the compensation value; and i denotes a transmission ratio from the drive motor to the input-side engagement component.

11. The gear shifting method according to claim 10, wherein:

$$B = k * \Delta T,$$

k represents a slope of change of the rotational speed of the output-side engagement component known at time T0, ΔT is one of the following three times or a sum of two or more of the following three times (i) a communication time from a transmission control unit, which controls the transmission of the electric vehicle, to a motor control unit, which controls the drive motor, (ii) a time for the motor control unit to execute one step, and (iii) a communication time from the motor control unit to the transmission control unit.

12. The gear shifting method according to claim 10, wherein:

the speed adjustment process comprises a judgment step that includes determining whether the speed adjustment has been completed based on whether preset conditions have been continuously met for a preset time, with the preset conditions comprising at least one of the following:

a deviation between the actual rotational speed of the input-side engagement component and the target rotational speed Vr is within a first error range; and a deviation of the rotational speed difference between the actual rotational speed of the output-side engagement component and the actual rotational speed of the input-side engagement component from the preset value is within a second error range.

13. The gear shifting method according to claim 12, wherein the gear shifting method comprises at least one of the following:

the first error range and the second error range are ±2 rpm; and the preset time is 20 ms.

* * * * *